United States Patent [19]

Whittam

[11] Patent Number: 4,645,655

[45] Date of Patent: Feb. 24, 1987

[54] PROCESS FOR THE PREPARATION OF ZEOLITE NU-27 USING TETRAMETHYLMEDIAMINE

[75] Inventor: Thomas V. Whittam, Darlington, England

[73] Assignee: Imperial Chemical Industries PLC, London, England

[21] Appl. No.: 621,728

[22] Filed: Jun. 18, 1984

[30] Foreign Application Priority Data

Jul. 6, 1983 [GB] United Kingdom ............... 8318336

[51] Int. Cl.$^4$ ............................................ C01B 35/10
[52] U.S. Cl. .................................... 423/277; 423/326; 423/328; 423/329; 502/60; 502/61; 502/62; 502/71; 502/74; 502/77; 502/202
[58] Field of Search ........................ 423/277, 326–333, 423/335, 328 C, 328 M, 328 T; 502/62, 71, 77, 202, 61, 60, 74

[56] References Cited

U.S. PATENT DOCUMENTS

| 4,146,584 | 3/1979 | Rollmann | 423/328 |
| 4,423,021 | 12/1983 | Rollmann et al. | 423/329 |
| 4,510,256 | 4/1985 | Zones | 502/77 |
| 4,568,654 | 2/1986 | Valyocsik | 502/77 |

FOREIGN PATENT DOCUMENTS

| 0063436 | 10/1982 | European Pat. Off. | 423/328 |
| 0077624 | 4/1983 | European Pat. Off. | 423/328 |

*Primary Examiner*—John Doll
*Assistant Examiner*—Jackson Leeds
*Attorney, Agent, or Firm*—Cushman, Darby & Cushman

[57] ABSTRACT

A crystalline zeolitic material, designated Nu-27, has a composition (in terms of mole ratios of oxides) expressed by the formula:

0 to 9 $M_2O:aY_2O_3:100$ $XO_2:0$ to 35 $H_2O$, wherein M is a monovalent cation of 1/n of a cation of valency n, a is from 0 to 9, X is silicon and/or germanium, Y is one or more of aluminium, iron, chromium, vanadium, molybdenum, arsenic, antimony, manganese, gallium or boron, and $H_2O$ is water of hydration additional to water notionally present when M is H and having a defined X-ray diffraction pattern. The zeolitic material is prepared from an aqueous reaction mixture containing a source of oxide $XO_2$, optionally a source of oxide $Y_2O_3$, and a tetralkylethylenediamine compound.

2 Claims, No Drawings

PROCESS FOR THE PREPARATION OF ZEOLITE NU-27 USING TETRAMETHYLMEDIAMINE

The present invention relates to a zeolite material, hereinafter referred to as Nu-27, and to a method of making it.

According to the present invention we provide a zeolite material Nu-27 having a composition (in terms of mole ratios of oxides) expressed by the formula:

0 to 9 $M_2O:aY_2O_3:100XO_2:0$ to 35 $H_2O$, wherein M is a monovalent cation or 1/n of a cation of valency n, a is from 0 to 9, X is silicon and/or germanium, Y is one or more of aluminum, iron, chromium, vanadium, molybdenum, arsenic, antimony, manganese, gallium or boron, and $H_2O$ is water of hydration additional to water notionally present when M is H, and having an X-ray pattern substantially as set out in Table 1 (as determined by standard technique using copper K$\alpha$ radiation). Table 1 shows X-ray data for zeolite Nu-27 as prepared and in the sodium hydrogen form, the X-ray pattern being little affected by the type of cation present.

TABLE 1

| X-ray data | | | |
|---|---|---|---|
| "as-made" Nu-27 | | Sodium hydrogen Nu-27 | |
| d(A) | $I/I_o$ | d(A) | $I/I_o$ |
| 10.97 | 6 | 10.97 | 24 |
| 9.16 | 15 | 9.15 | 54 |
| 7.53 | 2 | 7.51 | 1 |
| 6.82 | 1 | 6.78 | 7 |
| 6.21 | 1 | 6.19 | 3 |
| 5.90 | 2 | 5.93 | 11 |
|  |  | 5.80 | 9 |
| 4.61 | 47 | 4.59 | 69 |
| 4.45 | 21 | 4.47 | 23 |
| 4.29 | 100 | 4.28 | 100 |
| 3.97 | 40 | 3.96 | 40 |
| 3.75 | 13 | 3.74 | 11 |
| 3.68 | 16 | 3.69 | 18 |
| 3.58 | 22 | 3.56 | 17 |
| 3.42 | 7 | 3.40 | 5 |
| 3.34 | 25 | 3.32 | 20 |
| 3.26 | 28 | 3.25 | 38 |
| 3.10 | 4 | 3.10 | 5 |
| 3.00 | 6 | 3.01 | 5 |
|  |  | 2.99 | 6 |
|  |  | 2.82 | 5 |
| 2.69 | 8 | 2.68 | 7 |
| 2.52 | 7 | 2.51 | 9 |
| 2.46 | 4 | 2.45 | 5 |
| 2.30 | 5 | 2.29 | 6 |

Within the above definition of chemical composition, the number of moles of $Y_2O_3$ is in the range 0 to 9 and zeolite Nu-27 appears to be most readily formed in a state of high purity when the value of "a", the number of moles of $Y_2O_3$, is in the range 0 to 2.5. Preferred forms of the zeolite are those in which the molar ratio $XO_2/Y_2O_3$ is at least 100:1

This definition includes both freshly prepared zeolite Nu-27 ("freshly prepared" means the product of synthesis and washing, with optional drying, as hereinafter described) and also forms of it resulting from dehydration, and/or calcination, and/or ion exchange. In freshly prepared zeolite Nu-27, M may include an alkali metal cation, especially sodium, and/or ammonium, and usually or when prepared from alkylated nitrogen compounds, includes nitrogen-containing organic cations as described below or cationic degradation products thereof, or precursors thereof. These nitrogen containing cations are hereinafter referred to as Q.

The freshly prepared zeolite Nu-27 may also contain nitrogen-containing compounds well in excess of the 9 moles set out in the aforesaid definition of the composition of zeolites Nu-27, typically in the range 1 to 40 moles per mole of $Y_2O_3$. Since Nu-27 is a zeolite, the excess nitrogen-containing base must be physically trapped within the crystal lattice, because it is too large to escape. It can only be removed by thermal or oxidative degradation. This physically trapped basic material does not constitute part of the composition for the purpose of the definition. Thus a zeolite Nu-27 as made typically has the following molar composition.

0 to 9$M_2O$:1 to 50$Q^+$:$Y_2O_3$:30 to 5000$XO_2$:0 to 2000$H_2O$ wherein M is an alkali metal or ammonium.

The $H_2O$ content of freshly prepared or hydrogen zeolite Nu-27 depends on the conditions in which it has been dried after synthesis.

In calcined forms of zeolite Nu-27, M may be alkali metal but includes less or no nitrogen-containing organic compounds, since these are burnt out in the presence of air, leaving hydrogen as the other balancing cation.

Among the ion-exchanged forms of zeolite Nu-27 the ammonium ($NH_4^+$) is of importance since it can be readily converted to the hydrogen form by calcination. The hydrogen form can also be prepared directly by exchange with an acid. The hydrogen-form and forms containing metals introduced by ion exchange are described further below.

The invention provides also a method of making zeolite Nu-27 which comprises reacting an aqueous mixture comprising at least one oxide $XO_2$, and optionally at least one oxide $Y_2O_3$, and a tetraalkyl (normal) ethylene diamine, the mixture having the molar composition:

$XO_2/Y_2O_3$: at least 10, preferably at least 40
$OH^-/XO_2$: 0.1 to 6.0, preferably 0.1 to 1.0
$(M_1^+ + Q^+)/XO_2$: 0.05 to 2.0
$Q^+/(M_1^+ + Q^+)$: 0.1 to 1.0
$H_2O/XO_2$: 1 to 100
$M_2Z/H_2O$: $10^{-4}$ to 0.5, preferably $10^{-2}$ to 0.3 where X is silicon and/or germanium, Y is one or more of aluminium, iron, chromium, vanadium, molybdenum, arsenic, antimony, manganese, gallium or boron, $M_1$ and $M_2$ are alkali metal or ammonium or hydrogen, Q is the aforesaid tetraalkyl compound, an amine degradation product thereof, or a precursor thereof, or a related compound and Z is a strong acid radical. The tetraalkyl ethylene diamine compound is preferably tetramethyl ethylene diamine.

$M_1$, $M_2$ and/or Q can be present as hydroxides or salts of inorganic or organic acids provided the $OH^-/XO_2$ requirement is fulfilled. $M_2$ can be the same as or different from $M_1$.

The preferred alkali metal ($M_1$ or $M_2$) is sodium. The preferred oxide $XO_2$ is silica ($SiO_2$) and the preferred oxide $Y_2O_3$ is alumina ($Al_2O_3$).

The silica source can be any of those commonly considered for use in synthesising zeolites, for example powdered solid silica, silicic acid, colloidal silica or dissolved silica. Among the powdered silicas usable are precipitated silicas, especially those made by precipitation from an alkali metal silicate solution, such as the type known as "KS 300" made by AKZO, and similar products, aerosil silicas, fume silicas and silica gels suitable in grades for use in reinforcing pigments for rubber of silicone rubber. Colloidal silicas of various particle sizes may be used, for example 10 to 15 or 40 to 50 microns, as sold under the registered Trade Marks "LUDOX", "NALCOAG" and "SYTON". The usable dissolved silicas include commercially available waterglass silicates containing 0.5 to 6.0, especially 2.0 to 4.0 mols of $SiO_2$ per mol of alkali metal oxide, "active" alkali metal silicates as defined in UK Pat. No. 1,193,254, and silicates made by dissolving silica in an alkali metal hydroxide or quaternary ammonium hydroxide or a mixture thereof.

The alumina source is most conveniently sodium aluminate, but can be aluminium, an aluminium salt, for example the chloride, nitrate or sulphate, an aluminium alkoxide or alumina itself, which should preferably be in a hydrated or hydratable form such as colloidal alumina, pseudoboehmite, boehmite, gamma alumina or the alpha or beta trihydrate.

The reaction mixture is usually reacted under autogenous pressure, optionally with added gas, e.g. nitrogen, at a temperature between 85° and 250° C. until crytals of zeolite Nu-27 form, which can be from 1 hour to many months depending on the reactant composition and the operating temperature. Agitation is optional, but is preferable since it reduces the reaction time.

At the end of the reaction, the solid phase is collected on a filter and washed and is then ready for further steps such as drying, dehydration and ion-exchange.

If the product of the reaction contains alkali metal ions, these have to be at least partly removed in order to prepare the hydrogen form of Nu-27 and this can be done by ion exchange with an acid, especially a strong mineral acid such as hydrochloric acid or by way of the ammonium compound, made by ion exchange with a solution of an ammonium salt such as ammonium chloride. Ion exchange can be carried out by slurrying once or several times with the ion-exchange solution. The zeolite is usually calcined after ion exchange but this may be effected before ion-exchange or during ion-exchange if the latter is carried out in a number of stages.

In general, the cation(s) of zeolite Nu-27 can be replaced by any cation(s) of metals, and particularly those in Groups IA, IB, IIA, IIB, III (including rare earths) VIII (including noble metals) and the lead, tin, and bismuth. (The Periodic Table is in "Abridgements of Specifications" published by the UK Patent Office). Exchange is carried out using any water soluble salts containing the appropriate cation.

When used as a catalyst, zeolite Nu-27 can be associated with an inorganic matrix, which can be either inert or catalytically active. The matrix may be present simply as a binding agent to hold the small zeolite particles (0.005 to 10 microns) together, or it may be added as a diluent to control the amount of conversion in a process which may otherwise proceed at too high a rate, leading to catalyst fouling as a result of excessive coke formation. Typical inorganic diluents include catalyst support materials such as alumina, silica and kaolinic clays, bentonites, montmorillonites, sepiolite, attapulgite, Fullers earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these diluents. An effective way of mixing zeolite Nu-27 with such diluents is to mix appropriate aqueous slurries in a mixing nozzle and then to spray-dry the slurry. Other ways of mixing can be used.

If zeolite Nu-27 in any cationic form or as a catalytic composite is exchanged or impregnated with hydrogenation/dehydrogenation components, such as Ni, Co, Pt, Pd, Re, Rh, hydrocracking and reforming catalysts can be made, especially if the $Na_2O$ content is less than 0.1% w/w.

A wide range of hydrocarbon conversion catalysts can be prepared from zeolite Nu-27 by ion exchange or impregnation with cations, or oxides, selected from the following, Cu, Ag, Mg, Ca, Sr, Zn, Cd, B, Al, Sn, Pb, V, P, Sb, Cr, Mo, W, Mn, Re, Fe, Co, Ni, noble metals.

Usually the Nu-27 catalyst will be in the acid form, thus stoichiometry is maintained by $H^+$ or $H_3O^+$ as an additional balancing cation, or as sole cation. Such catalysts may find application in the following processes; catalytic cracking, hydrodesulphurization, hydrodenitrification, catalytic dewaxing, alkylation of alkanes or aromatics, dealkylation, disproportionation, isomerisation of alkanes and alkyl benzenes, e.g. xylenes, dehydration reactions, oxidation, polymerisation and conversion of methanol to olefins. Zeolite Nu-27 may also find applications in the separation of aromatics and cycloparaffins, and in pollution control by its ability to remove organic contaminants from aqueous effluents as a result of its hydrophobic nature.

The invention is illustrated by the following Examples.

EXAMPLE 1

A reaction mixture was prepared having the following molar composition

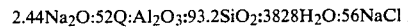

2.44$Na_2O$:52Q:$Al_2O_3$:93.2$SiO_2$:3828$H_2O$:56NaCl 56.3 g tetramethylethylenediamine were dispersed in 192.3 g Syton X-30 ($Na_2O$:0.34$Al_2O_3$:74.6$SiO_2$:74.6$SiO_2$:651.4$H_2O$). Next 1.8 g sodium aluminate (1.18$Na_2O$:$Al_2O_3$:1.2$H_2O$) were dissolved in 10 g water and the aluminate solution stirred into the silica dispersion, followed by 31.1 g sodium chloride dissolved in 502 g water. The mixture was thoroughly homogenised for ½ hour, and then reacted for 4 days at 180° C. The product was filtered, washed and dried overnight at 120° C., and was highly crystalline sodium tetramethylethylenediamine Nu-27 having a molar composition

0.9$Na_2O$:2.4TMED:$Al_2O_3$:108$SiO_2$:12$H_2O$ and an X-ray diffraction pattern substantially as shown in columns 1 and 2 of Table 1.

EXAMPLE 2

The product of Example 1 was calcined for 17 hours in moist air at 650° C., followed by three slurry exchanges at 60° C. with 1N hydrochloric acid (10 g fresh acid per g of zeolite each stage). The product was recalcined for 3 hours at 550° C., and had the following composition

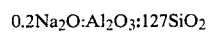

0.2$Na_2O$:$Al_2O_3$:127$SiO_2$ with an X-ray diffraction pattern substantially as shown in columns 3 and 4 of Table 1.

EXAMPLE 3

The preparation described in Example 1 was repeated except that the quantity of tetramethylethylenediamine was reduced to 28 g. The product after reaction for 5 days at 180° C. was again highly crystalline Nu-27 with an X-ray diffraction pattern substantially as shown in Table 1.

I claim:

1. A method of making zeolite Nu-27 which comprises reacting an aqueous mixture comprising at least one oxide $XO_2$, and optionally at least one oxide $Y_2O_3$, and a tetra-alkyl (normal) ethylene diamine, the mixture having the molar composition:

$XO_2/Y_2O_3$: at least 10
$OH^-/XO_2$: 0.1 to 6.0
$(M_1^+ + O^+)/XO_2$: 0.05 to 2.0
$O^+/(M_1^+ + O^+)$: 0.1 to 1.0
$H_2O/XO_2$: 1 to 100
$M_2Z/H_2O$; $10^{-4}$ to 0.5, where X is silicon and/or germanium, Y is one or more of aluminium, iron, chromium, molybdenum, arsenic, antimony, manganese, gallium or boron, $M_1$ and $M^2$ are alkali metal or ammonium or hydrogen, O is the aforesaid tetraalkyl compound and Z is a strong acid radical, the proportions of reaction components and reaction conditions being selected to produce Nu-27, in which the tetraalkyl ethylenediamine compound is tetramethylethylenediamine.

2. A method as claimed in claim 1 wherein the ratio $XO_2/YO_3$ is at least 40, the ratio $OH^-/XO_2$ is in the range 0.1 to 1.0 and the ratio $M_2Z/H_2O$ is in the range $10^{-2}$ to 0.3.

* * * * *